United States Patent Office 2,789,965
Patented Apr. 23, 1957

2,789,965

POLYCARBONATES FROM 4,4'-BIS-(β-HYDROXY-ETHOXY) - BIPHENYL - BIS - (ALKYL OR ARYL CARBONATES)

Delbert D. Reynolds and John Van Den Berghe, Rochester, N. Y., assignors to Eastman Kodak Company, Rochester, N. Y., a corporation of New Jersey No Drawing. Application December 8, 1953,
Serial No. 397,040

16 Claims. (Cl. 260—47)

This invention relates to highly polymeric linear polycarbonates prepared by the self-condensation in the presence of an ester-interchange catalyst of a 4,4'-bis-(β-hydroxyethoxy) biphenyl-bis-(alkyl or aryl carbonate) or substituted derivatives thereof wherein a hydrogen atom is replaced by a lower alkyl radical. These starting materials are hereinafter frequently referred to as bis-(carbonate) monomers.

This invention also includes highly polymeric linear polycarbonates prepared by condensing mixtures of the bis-(carbonate) monomers defined above.

This invention furthermore relates to the process for preparing these highly polymeric linear polycarbonates by the self-condensation of a bis-(carbonate) monomer, said process being characterized by an ester-interchange reaction whereby an alkyl or an aryl carbonate is removed by vaporization.

It is an object of this invention to provide unexpectedly superior highly polymeric linear polycarbonates having high melting points and other valuable properties as described herein. An additional object of this invention is to provide a process for the preparation of these polycarbonates. Other objects will become apparent hereinafter.

Linear polycarbonates prepared by the condensation of p-xylylene glycol with an alkyl carbonate have been described by Carothers and his followers in a few patents and in Carothers' collected papers. Practically no subsequent work appears to have been performed in connection with the preparation of highly polymeric linear polycarbonates. The materials prepared as described in Carothers' collected papers were of relatively low molecular weight and do not constitute highly polymeric linear crystalline polycarbonates which are useful as waxes, plasticizers, etc., and which possess an unexpectedly high intrinsic viscosity such that they can be extruded to form films and the like which can be mechanically worked and heat set to form molecularly oriented structures. According to Carothers, all of the polycarbonates described were prepared by alcoholysis between a glycol and ethyl carbonate in the presence of an alkaline catalyst such as sodium whereby vapors of an alcohol were driven off by heating. One of Carothers' followers suggests that a trace of an aliphatic dibasic acid can be introduced into the reactants in Carothers' process whereby "superpolycarbonates" can be produced by heating under a vacuum. The prior art does not describe any completely satisfactory procedure which will produce linear highly polymeric polycarbonates. In contrast, the process of the instant invention is simple, direct, easily reproducible, and the polycarbonates obtainable have high melting points and excellent intrinsic viscosities.

There are other regards in which the polycarbonates of this invention are superior to those described in the prior art in their physical characteristics. These include the percentage of elongation, tenacity, elastic recovery, work recover, stress-relaxation, tensile strength, resistance of films to tearing and to repeated folding, modulus of elasticity, electrical properties, etc.

The characteristics of the products of the instant invention are quite surprising in view of the fact that the benzene analogs self-condense to form non-crystalline lower melting products such as those described in our copending application filed on even date herewith, Serial No. 397,039.

We have therefore discovered polycarbonates which upon initial examination might appear somewhat related to those previously described but upon more careful examination are found to be entirely new and distinct in regard to their nature and their utility whereby products which could not feasibly be prepared from the products of the prior art are now made possible.

The process of this invention for producing the novel polycarbonates comprises (A) self-condensing a bis-(carbonate) monomer having the following formula:

wherein $R_1$ and $R_2$ each represents a radical selected from the class consisting of lower alkyl radicals containing from 1 to 4 carbon atoms and aryl radicals of the benzene series containing from 6 to 8 carbon atoms, (B) in the presence of an ester interchange catalyst as a condensing agent, (C) at an elevated temperature, (D) the condensation being conducted in an inert atmosphere, and (E) the latter part of the condensation being conducted at a very low pressure.

It can readily be seen from the description of this process that there is no problem involved in adjusting the ratio of carbonate constituents to the 4,4'-bis-(β-hydroxyethoxy) biphenyl constituents in the reaction vessel since the polycarbonates are produced according to this invention by the self-condensation of only one starting material. This establishes the composition of the polycarbonate produced since there can be no variation in the proportion of carbonate and dihydroxy compound constituents. Moreover, the nature of this process makes it admirably suited to conducting the process on a continuous basis since no problems are involved in maintaining critical proportions of reactants.

Examples of the starting materials, i. e. the bis-(carbonate) monomers which can be used in the process of this invention include 4,4'-bis-(β-hydroxyethoxy)-biphenyl-bis-(ethyl carbonate), 4,4'-bis-(γ-hydroxypropoxy)-biphenyl-bis-(ethyl carbonate), 4,4'-bis(β-hydroxyethoxy)-biphenyl - bis-(p-tolyl carbonate), 4,4'-bis-(β-hydroxyethoxy)-biphenyl-bis-(phenyl carbonate), 4,4'-bis-(δ-hydroxybutoxy)-biphenyl-bis-(isopropyl carbonate), etc.

In carrying out the process of this invention the ester-interchange catalysts which can be employed as condensing agents include the following compounds: alkali metals, the alkaline earth metals, the oxides of these two groups of metals, the alkoxides containing from 1 to 8 carbon atoms of these two metals, the carbonates and borates of these two metals, lead oxide, compounds of germanium, antimony, cobalt, and other metals including compounds having the following formulas:

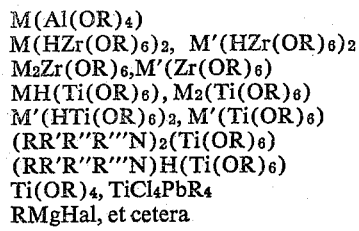

wherein M represents an alkali metal, M' represents an alkaline earth metal selected from the group consisting of magnesium, calcium and strontium, R represents an alkyl group containing from 1 to 6 carbon atoms, R', R" and R'" each represents a member of the group consisting of R and an aryl group of the benzene series containing from 6 to 9 carbon atoms and Hal represents a halogen atom.

The ester interchange catalytic condensing agents which have been described above can be advantageously employed in an amount of from 0.005% to about 0.2% by weight of these catalysts based upon the weight of the starting material being condensed. Higher or lower percentages can also be employed. Generally, from about 0.01% to about 0.1% of at least one of these ester-interchange catalysts is particularly advantageous. Many of these ester-interchange catalytic condensing agents are described in the prior art relating to the preparation of polyesters. There are numerous literature and patent references describing such catalysts. Some of the valuable ester-interchange catalytic condensing agents are described in a series of copending applications filed on October 3, 1952 by one or more of Caldwell, Wellman, and Reynolds, Serial Nos. 313,072 to 313,078 inclusive: Serial No. 313,072, Patent No. 2,720,502; Serial No. 313,073, Patent No. 2,720,503; Serial No. 313,074, Patent No. 2,720,504; Serial No. 313,075, Patent No. 2,727,881; Serial No. 313,076, Patent No. 2,720,505; Serial No. 313,077, Patent No. 2,720,506; Serial No. 313,078, Patent No. 2,720,507.

The temperatures at which the condensation can be conducted are advantageously increased during the course of the condensation. Advantageously, the condensation reaction can be considered as being conducted in two stages. The temperature to which the condensation reaction mixture is initially raised at the beginning of the first stage is advantageously in excess of about 200° C. Lower temperatures can also be employed. It is convenient to consider the condensation process as being conducted in two separate stages although the actual condensation itself continues smoothly from the first stage into the second stage. The principal distinction between the so-called two stages lies in the fact that during the latter stage the pressure of the adjacent atmosphere under which the condensation is performed is greatly reduced. Although the temperature can remain the same for both the first and the second stage, it may be advantageous to employ a somewhat higher temperature at about the same time as the pressure is reduced. Temperatures employed during the latter part of the second stage can advantageously be as high as 240°–250° C. or higher, with the maximum temperature being determined by the tendency of the polycarbonate to decompose at extremely high temperatures.

The reduced pressure which is employed during the second stage of the condensation is advantageously less than about 15 mm. of Hg pressure. Most advantageously the pressure is less than about 0.5 mm. of Hg pressure. Generally speaking, pressures are employed which are the lowest pressures obtainable by the employment of an efficient high vacuum mechanical pump. Such pressures generally are in the range of less than 1 mm. of Hg pressure.

The inert atmospheres which can be advantageously employed in the course of the condensation reaction include atmospheres of nitrogen, hydrogen, helium, carbon dioxide, etc.

It is generally advantageous to stir the condensing reaction mixture in order to maintain a reasonably even distribution of temperature throughout the reaction mixture and to otherwise facilitate the condensation. However, this is not essential especially when small quantities of bis-(carbonate) monomers are being condensed. During the course of the reaction an alkyl or an aryl carbonic acid ester will be evolved as a gas as indicated hereinabove. Stirring facilitates the removal of this material in its gaseous form. Either as an aid to the stirring operation or in lieu thereof, the inert gas can be advantageously bubbled through the reaction mixture whereby the removal of the carbonic acid ester is facilitated.

The products of this invention are linear highly polymeric polycarbonates having high intrinsic viscosities, melting points above about 210° C., which are composed of the following repeating units:

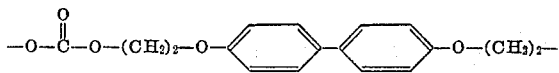

wherein the units are connected by ester linkages.

The intrinsic viscosities specified in this application are measured by standard procedures in a solution of 60% phenol—40% sym. tetrachlorethane.

The various conditions described somewhat generally hereinabove can obviously be varied considerably to suit the particular starting material being condensed, the catalyst employed, etc.

The preparation of interpolycarbonates is described in copending applications, i. e. Serial No. 407,804, Serial No. 407,805, and Serial No. 407,806, filed February 2, 1954. Besides employing bis-(carbonate) monomers in the formation of interpolycarbonates, the polycarbonates of this invention can be mechanically admixed with other polycarbonates to form mixed polymers possessing average properties derived from the various components of the mixture. It is similarly obvious that both the unmodified polycarbonates and the interpolycarbonates can be suitably blended or mixed with other high polymers such as polyesters, polyurethanes, polyamides, polystyrene, polyethylene, etc., insofar as the polycarbonates of this invention are compatible with such high polymers. The products which can be produced include waxes, fibers, films, sheets, molded articles, extrusion products, etc.

As regards continuous processes for carrying out the preparation of the polycarbonates of this invention, it is obvious that many types of apparatus known to be useful in conducting various related continuous processes could be adapted for the preparation of these polycarbonates. For example, a suitable elongated cylindrical reaction vessel (either upright or mounted at an angle) can be employed whereby the first stage of the reaction can be performed by introducing the starting material into the top of the reaction vessel to form an initial charge. The reaction vessel employed can be advantageously provided with a stirring device, a gas inlet and a heating means. The introduced bis-(carbonate) monomer can then be mixed with an ester-interchange catalyst and stirring can be begun while heat is applied. An inert gas such as hydrogen can be introduced into the reaction vessel so as to bubble through the mixture or such a gas can merely be maintained as an atmosphere above the mixture. When a sufficient period of time has elapsed to complete the first stage of the condensation reaction, some of the condensed reaction mixture can be withdrawn through a valve in the bottom of the reaction vessel and more of the starting material introduced into the top thereof. The material removed from the bottom of the reaction vessel can then be immediately introduced into a stage II reaction vessel equipped in the same manner as the first reaction vessel and additionally provided with a high vacuum mechanical pump. It is generally advantageous to conduct the second stage of the reaction as a batch operation although by employing a sufficiently elongated stage II reaction vessel, the process can be conducted continuously by removing the final polycarbonate from the bottom of the stage II reaction vessel after the elapse of sufficient time at the elevated temperature and vacuum, and then continuously introducing more of the partial condensate from the first stage into the top of the stage II reaction vessel. In addition to such a continuous method of preparing these polycarbonates, other methods analogous thereto concerning other polymers (e. g. U. S. 2,647,885) can also be employed.

The bis-(carbonate) monomers employed in accordance with this invention can be prepared as described below. This process is essentially a condensation of 4,4'-bis-(β-hydroxyethoxy)-biphenyl with ethyl chlorocarbonate in the presence of pyridine.

PREPARATION OF 4,4'-BIS (β-HYDROXYETHOXY) BIPHENYL-BIS (ETHYL CARBONATE)

A. *4,4'-bis-(β-hydroxyethoxy) biphenyl*

Into a solution of 166 g. (4 moles) of sodium hydroxide in 2 l. of alcohol was stirred 372 g. (2 moles) of p,p'-diphenol and the resulting slurry was heated to reflux temperature on a steam bath. The steam was turned off and 354 g. (4.4 moles) of ethylene chlorohydrin was added from a dropping funnel at such a rate that the reflux temperature was maintained. The addition required 15 minutes. The reaction mixture was then refluxed for 27 hours and filtered hot. The precipitate was digested with hot water, filtered and dried to give 349 g. (64%) of 4,4'-bis-(β-hydroxyethoxy) biphenyl, M. P. 210–212° C.

B. *4,4' - bis - (β - hydroxyethoxy) biphenyl - bis - (ethyl carbonate)*

One mole (274 g.) of finely powdered 4,4'-bis-(β-hydroxyethoxy) biphenyl and 2.5 l. of pyridine were placed in a 5 l. three-necked flask equipped with a stirrer, a long-stemmed dropping funnel dipping below the surface of the liquid and a long-stemmed thermometer. The flask was placed in an ice bath and the slurry was cooled to 5° C. The slurry was stirred while 238 g. (2.2 moles, 210 ml.) of ethyl chlorocarbonate was introduced through the dropping funnel over a period of thirty minutes at such a rate that the temperature of the reaction mixture never exceeded 10° C. Stirring was continued for 6 hours at room temperature and the mixture was then allowed to stand for 48 hours. Sufficient cold dilute hydrochloric acid was added to make the mixture acid to Congo red. The resulting precipitate was filtered and the wet product was dissolved in boiling acetone, decolorized with carbon, filtered and the filtrate cooled to −20° C. The light cream colored product amounted to 250 g. (60%) M. P. 117–119° C. Recrystallization from alcohol gave material melting at 119–120° C.

This process can be applied to the preparation of any of the bis (carbonate) monomers employed in this invention.

In the examples given below the catalysts were generally prepared by dissolving a metal such as sodium in 100 ml. of an alcohol such as ethanol. This forms a solution of the metal alkoxide. The intrinsic viscosities of the polycarbonates were measured at 25° C. in 60% phenol—40% sym. tetrachlorethane.

The following examples will serve to further illustrate this invention:

EXAMPLE 1.—POLYCARBONATE

One hundred grams of 4,4'-bis-(β-hydroxyethoxy)-biphenyl-bis-(ethyl carbonate) was mixed with 1 cc. of sodium hydrogen titanium butoxide solution and heated under an atmosphere of nitrogen in a 240° C. oil bath. This catalyst solution was prepared by dissolving 1 g. of sodium in 99 g. of n-butanol, adding 14.78 g. Ti(OC₄H₉)₄ and diluting to 200 cc. with n-butanol. The diethyl carbonate was removed by distillation through a Vigreux column. After one hour the reaction flask was equipped with a mechanical stirrer. The flask was evacuated by means of a mechanical vacuum pump and the reaction mixture stirred for one and one-half hours. During this latter period the oil bath was maintained at 255–265° C. The polymer became extremely viscous. Fibers were drawn from the melted polymer. When cooled to room temperature, these fibers could be cold drawn and heat-set to form tough fibers. The main polymer mass cooled to form a very tough, buff-colored crystalline product with a melting point of 215° C. and an intrinsic viscosity of 0.68 in 60% phenol—40% sym. tetrachloroethane.

EXAMPLE 2.—POLYCARBONATE

Two hundred grams of 4,4'-bis-(β-hydroxyethoxy)-biphenyl-bis-(ethyl carbonate) was mixed with 2 cc. of sodium butoxide catalyst solution and heated under an atmosphere of nitrogen in a 250° oil bath. The diethyl carbonate was removed through a Vigreux column. After one and one-half hours, the reaction flask was evacuated by means of a water pump and the reaction mixture stirred mechanically for ten minutes. The water pump was then replaced by a mechanical pump. Stirring was continued at 270° C. under vacuum for one hour. During the last half hour the polymer wrapped around the stirrer. After cooling, the polymer became a tough, crystalline material. It could be extruded to form a white crystalline but tough film. The material had a melting point of 220° C. and an intrinsic viscosity of 0.78.

EXAMPLE 3.—POLYCARBONATE

One hundred and fifty grams of 4,4'-bis-(β-hydroxyethoxy) - biphenyl - bis - (phenyl carbonate) was self-condensed employing 1.5 cc. of potassium methoxide solution as the catalyst. The conditions were otherwise the same as in Example 2. The product was essentially the same.

EXAMPLE 4.—POLYCARBONATE

One hundred grams of 4,4'-bis-(β-hydroxyethoxy)-biphenyl-bis-(propyl carbonate) was self-condenser employing as the catalyst 0.2 g. of lithium aluminum methoxide (see Caldwell application 313,071 referred to above). The conditions were otherwise the same as in Example 1. The product was essentially the same.

EXAMPLE 5.—POLYCARBONATE

A quantity of 4,4'-bis-(β-hydroxyethoxy)-biphenyl-bis-(ethyl carbonate) was self-condensed in the presence of Ti(OC₄H₉)₄ according to the process described above. Stage I was conducted for 40 minutes at 240°–250° C. under a nitrogen atmosphere. Stage II was conducted for 1.5 hours at 250° C. under a pressure of 0.3–0.4 mm. of Hg. The product was a crystalline tough polymer which was buff colored and had an intrinsic viscosity of 0.56.

EXAMPLE 6.—POLYCARBONATE

One hundred five grams of 4,4'-bis-(β-hydroxyethoxy)-biphenyl-bis-(ethyl carbonate) was mixed with five drops of titanium butoxide and heated, under nitrogen, in an oil bath maintained at 230° C. After seventy-five minutes, the temperature was raised to 260° C. and the reaction mixture was stirred under reduced pressure (0.1 mm. of Hg) for three hours. The cooled product crystallized rapidly to a white, porcelain-like material which melted at 225° C. Its intrinsic viscosity in a 60:40 phenol: s-tetrachloroethane mixture was 0.69.

EXAMPLE 7.—POLYCARBONATE

A quantity of 4,4'-bis-(β-hydroxyethoxy)-biphenyl-bis-(ethyl carbonate) was self-condensed in the presence of 0.05% by weight of LiAl(OC₂H₅)₄ as the catalyst (see Reynolds and Caldwell application 313,077 referred to above). The procedure was that described above. Stage I was conducted at 240°–250° C. in a nitrogen atmosphere for 40 minutes. Stage II was conducted at 250° C. for 1.5 hours at a pressure of 0.3–0.4 of Hg. The product was a buff colored, polymer which crystallized very rapidly. It contracted and freed itself from the sides of the reaction flask. The product was quite brittle and had an intrinsic viscosity of 0.56. It was capable of forming fibers and films which could be cold-drawn and heat-set. The melting point of this polyester was about 215° C.

EXAMPLE 8.—POLYCARBONATE 0.5 gram mole of 4,4'-bis(β-hydroxyethoxy-biphenyl-bis-(ethyl carbonate) was self-condensed in the presence of 0.3 g. of Na₂Zr (OC₂H₅)₆ (see copending application 313,071 referred to above). The procedure was that described above. Stage I was conducted at 245° C. in a hydrogen atmosphere for 50 minutes. Stage II was conducted at 265° C. for 2 hours at a pressure of 0.5 mm. of Hg. The crystalline polymer obtained was light in color, tough and capable of being extruded to form film which could be plane oriented and heat set to produce a valuable support for photographic elements.

The unusual nature of this invention is further emphasized by the fact that compounds having the following formulas have also been tried, but without success, in lieu of the bis-(carbonate) monomers of this invention:

(A) 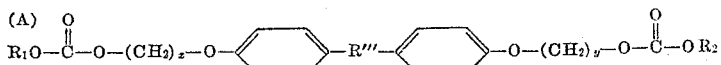

(B) 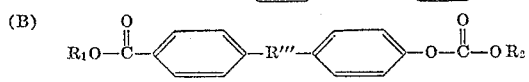

wherein R₁ and R₂ have been defined above, x and y each represents 1, 2 or 3 and R''' represents a radical such as —SO₂— or —CO— or the like.

In Formula A when x and y are 2, R₁ and R₂ are ethyl and R''' is —CO—, the product employing either Ti(OC₄H₉)₄ or Li Al (OC₂H₅)₄ as the catalyst was a non-crystalline, dark brown, porous, unsatisfactory mass. The preparation was accompanied by the evolution of carbon dioxide.

In Formula A when x and y are 2, R₁ and R₂ are ethyl and R''' is —SO₂—, the product employing either Ti(OC₄H₉)₄ or Li Al (OC₂H₅)₄ as the catalyst was an amber non-crystalline product of relatively low intrinsic viscosity (0.34); although this product was not considered satisfactory due to some decomposition, the polymer could be extruded to form fibers which were capable of being cold drawn.

In Formula B when R₁ and R₂ are ethyl and R''' is —SO₂—, the product employing Ti(OC₄H₉)₄ as the catalyst was a brown, glassy, non-crystalline, brittle material which was not considered satisfactory for fibers, film, molding compositions, etc. It appeared that some decomposition had occurred.

In Formula B when R₁ and R₂ are ethyl and R''' is —CO—, the product employing either Ti(OC₄H₉)₄ or Li Al (OC₂H₅) as the catalyst was a dark, non-crystalline mass which melted only upon heating to about 300° C. with considerable darkening which appeared to be due to some decomposition phenomena.

The polymeric materials embodying the invention can be produced either batch-wise or in continuous fashion as described above, and the products can be used alone or in admixture with similar or dissimilar polymeric materials. These modified or unmodified polymers can be used for forming fibers, for molding articles, for forming films or sheets suitable for use as film supports, for either black-and-white or color photographic film or for similar uses. The photographic films which can be produced can advantageously comprise a film support of the above-described polycarbonates upon which is deposited one or more layers of a silver halide emulsion which can contain appropriate sensitizers or adhesives to suit the intended photographic use.

We claim:

1. A process for preparing a highly polymeric linear polycarbonate comprising (A) self-condensing a bis-(carbonate) monomer having the following formula:

wherein R₁ and R₂ each represents a radical selected from the group consisting of lower alkyl radicals containing from 1 to 6 carbon atoms and aryl radicals of the benzene series containing from 6 to 8 carbon atoms, (B) in the presence of an ester-interchange catalyst, (C) at an elevated temperature, (D) the condensation being conducted in an inert atmosphere, and (F) the latter part of the condensation being conducted at a very low pressure.

2. A process as defined in claim 1 wherein the elevated temperature during the course of the condensation is in excess of about 200° C.

3. A process as defined in claim 2 wherein the ester-interchange catalyst is employed in an amount of from about 0.005% to about 0.2% based on the weight of the bis (carbonate) monomer.

4. A process as defined in claim 3 wherein the low pressure is less than about 15 mm. of Hg pressure.

5. A process as defined in claim 4 wherein the bis (carbonate) monomer is 4,4'-bis-(β-hydroxyethoxy)-biphenyl-bis-(ethyl carbonate).

6. A linear highly polymeric polycarbonate having an intrinsic viscosity of at least about 0.6 measured in a solution of 60 volumes of phenol and 40 volumes of tetrachloroethane and a melting point above about 210° C., which is composed of the following repeating units:

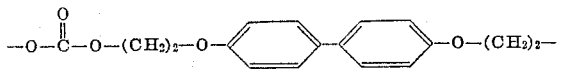

wherein the units are connected by ester linkages and one end of each polymer molecule contains an R₁-radical attached to the terminal free oxygen bond and the other end of each polymer molecule contains an

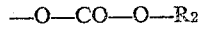

radical attached to the terminal free methylene bond, wherein R₁ and R₂ each represents a radical selected from the group consisting of lower alkyl radicals containing from 1 to 6 carbon atoms and aryl radicals of the benzene series containing from 6 to 8 carbon atoms.

7. 4,4' - bis - (β - hydroxyethoxy) - biphenyl - bis- (ethyl carbonate).

8. A process as defined in claim 3 wherein the catalyst is titanium butoxide.

9. A process as defined in claim 3 wherein the catalyst is potassium methoxide.

10. A process as defined in claim 3 wherein the catalyst is sodium butoxide.

11. A process defined in claim 3 wherein the catalyst is lithium aluminum ethoxide.

12. A process defined in claim 3 wherein the catalyst is lithium aluminum methoxide.

13. A compound having the following formula:

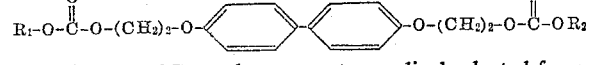

wherein R₁ and R₂ each represents a radical selected from the group consisting of lower alkyl radicals and aryl radicals of the benzene series containing from 6 to 8 carbon atoms.

14. 4,4' - bis - (β - hydroxyethyl) - biphenyl - bis- (propyl carbonate).

15. 4,4' - bis - (β - hydroxyethyl) - biphenyl - bis- (phenyl carbonate).

16. 4,4' - bis - (β - hydroxyethyl) - biphenyl - bis- (butyl carbonate).

References Cited in the file of this patent

UNITED STATES PATENTS

| | | |
|---|---|---|
| 2,210,817 | Peterson | Aug. 6, 1940 |
| 2,379,252 | Muskat et al. | June 26, 1945 |
| 2,468,975 | Held et al. | May 3, 1949 |